United States Patent [19]

Mackley et al.

[11] Patent Number: 4,857,127
[45] Date of Patent: Aug. 15, 1989

[54] PROCESS FOR PREPARING IMPROVED ORIENTED POLYMER FILMS AND TAPES

[75] Inventors: Malcolm R. Mackley, Cambridge, Great Britain; Christopher Anton, Gwynedd, Wales

[73] Assignee: National Research Development Corporation, London, Great Britain

[21] Appl. No.: 29,798

[22] Filed: Mar. 25, 1987

[30] Foreign Application Priority Data

Mar. 26, 1986 [GB] United Kingdom ............... 8607519

[51] Int. Cl.$^4$ ........................ B29D 7/01; B29D 9/00
[52] U.S. Cl. .................................. 156/242; 156/246; 156/308.2; 264/204; 264/280
[58] Field of Search .................. 264/248, 280, 204; 156/228, 308.2, 309.6, 311, 242, 246

[56] References Cited

U.S. PATENT DOCUMENTS

| Re. 31,925 | 6/1985 | Jenks et al. ............... 264/280 |
| 2,067,025 | 1/1937 | Schmidt .................... 264/280 |
| 3,009,847 | 11/1961 | Alles et al. ................ 154/53.6 |
| 3,093,532 | 6/1963 | Miller et al. ............... 156/430 |
| 3,767,737 | 10/1973 | Lundstrom ................ 264/41 |
| 3,961,122 | 6/1976 | Gaines, Jr. et al. ......... 428/220 |
| 3,997,386 | 12/1976 | Oshida et al. ............. 264/248 |
| 4,089,918 | 5/1978 | Kato et al. ................ 264/40.7 |
| 4,268,470 | 5/1981 | Capaccio et al. .......... 528/502 |
| 4,403,069 | 9/1983 | Keller et al. .............. 525/197 |
| 4,501,856 | 2/1985 | Harpell et al. ............ 525/240 |
| 4,514,351 | 4/1985 | Kaeufer et al. ........... 264/280 |
| 4,575,470 | 3/1986 | Fakirov et al. ........... 156/308.2 |
| 4,643,865 | 2/1987 | Okada et al. ............. 264/280 |

FOREIGN PATENT DOCUMENTS

| 236107 | 10/1964 | Austria ...................... 156/308.2 |
| 686454 | 5/1964 | Canada ....................... 264/280 |
| 0056875 | 8/1982 | European Pat. Off. . |
| 97008 | 12/1983 | European Pat. Off. ..... 264/280 |
| 2352020 | 12/1977 | France . |
| 46-38339 | 11/1971 | Japan . |
| 47-12851 | 4/1972 | Japan . |
| 117069 | 10/1978 | Japan ......................... 264/280 |
| 33924 | 4/1981 | Japan ......................... 264/280 |
| 220329 | 12/1984 | Japan ......................... 264/280 |
| 15120 | 1/1985 | Japan ......................... 264/280 |
| 773718 | 5/1957 | United Kingdom ........ 264/280 |
| 1360115 | 7/1974 | United Kingdom . |
| 1391525 | 4/1975 | United Kingdom . |
| 2051667 | 1/1981 | United Kingdom . |

OTHER PUBLICATIONS

Mackley and Sapsford, *Techniques of Preparing High Strength, High Stiffness Polyethylene Fibres by Solution Processing*, University of Cambridge, Cambridge, 1982.

*Primary Examiner*—James Lowe
*Attorney, Agent, or Firm*—Finnegan, Henderson, Farabow, Garrett & Dunner

[57] ABSTRACT

A postforming process for an oriented film or tape of polymer material, which process comprises subjecting at least one layer of such an oriented film or tape to a pressure greater than ambient pressure while heating the oriented film or tape at a temperature at which partial melting thereof occurs but which does not exceed 145° C.

14 Claims, 3 Drawing Sheets

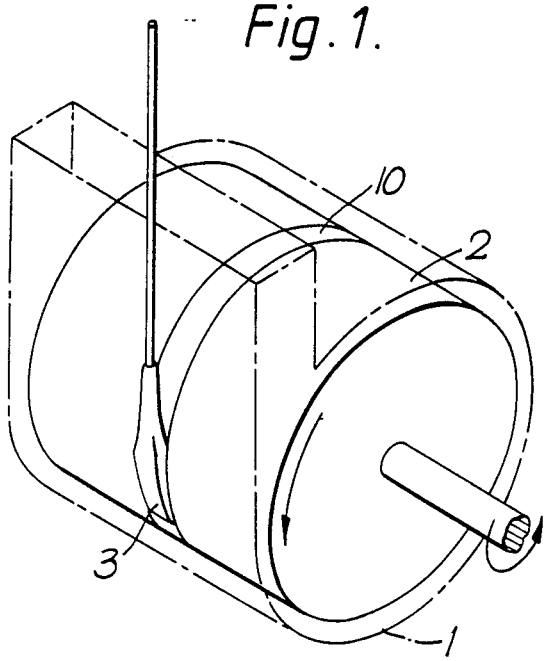
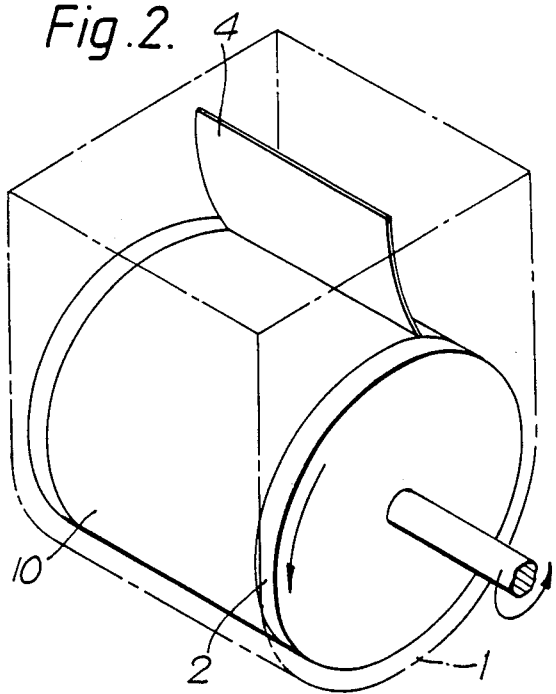

PROCESS FOR PREPARING IMPROVED ORIENTED POLYMER FILMS AND TAPES

This invention relates to improved oriented polymer films; more particularly, this invention relates to processes for the continuing preparation of improved oriented films of polymer materials; to improved oriented films of polymer materials so prepared and to certain oriented films as new products; and to composite materials comprising the oriented films.

In UK Patent Specification No. 2,164,603A which corresponds to U.S. application Ser. No. 06/878,971, a process for the continuous preparation of anoriented film of a polymer material is disclosed, which process comprises:

(i) shearing at least one film of a solution and/or gel of the polymer material between at least one set of two surfaces which are in motion relative to one another, at least one of which surfaces is endless, and (ii) continuously removing the or each oriented film of polymer material from the surface on which it is formed.

Also described herein is a composite material the dispersed phase of which comprises said oriented film of polymer material and wherein the continuous phase may comprise a cement such as a Portland or pozzolanic cement, a thermosetting polymer matrix such as an epoxy resin, or a thermoplastic matrix such as polyolefin, for example polyethylene, polypropylene or a blend thereof.

In accordance with one aspect of the present invention there is provided a process for the continuous preparation of an oriented film or tape of a polymer material, which process comprises:

(i) shearing at least one film of a solution and/or gel of the polymer material between at least one set of two surfaces which are in motion relative to one another, at least one of which surface is endless, (ii) continuously removing the or each oriented film or tape of polymer material from the surface on which it is formed; and (iii) subjecting at least one layer of the oriented film or tape to a pressure greater than ambient pressure while heating the oriented film or tape at a temperature at which partial melting thereof occurs but which does not exceed 145° C.

Films and tapes prepared in accordance with this process are found to have greater translucency; higher density (greater than 0.65 g cm$^{-3}$ for example 0.7 g cm$^{-3}$); and greater toughness and tear resistance.

In accordance with a further aspect of this invention, there is provided a postforming process for an oriented film or tape of polymer material preparable by the process claimed in UK Patent Specification No. 2,164,603, which process comprises subjecting at least one layer of such an oriented film or tape to a pressure greater than ambient pressure while heating the oriented film or tape at a temperature at which partial melting thereof occurs but which does not exceed 145° C.

The process of the present invention is applicable to any thermoplastic organic polymer material, preferably a crystallisable such polymer material, provided only that the polymer material comprises at least a fraction of sufficiently high molecular weight and that this latter material can form a solution and/or gel. Examples include unsubstituted or mono- or poly-halo-, for example chloro- or fluoro-, substituted vinyl polymers such as polyolefins, preferably linear polyolefins, polyvinyl chloride and polyvinylidene difluoride; polyalkylene oxides such as polyethylene oxide; polyacetals such as polyoxymethylene and polyacetaldehyde; polyamides, preferably aliphatic polyamides; unsubstituted or hydroxy-substituted polyesters such as PHB and polyethylene terephthalate; and polyetherketones.

The polymer material is suitably an addition homo- or copolymer, desirably a polyolefin. Preferably, the polyolefin comprises polyethylene, especially inert linear polyethylene, polypropylene, a polyethylene-polypropylene copolymer or a blend comprising at least one polyolefin therefrom.

It is desirable that the polymer material has a weight average molecular weight ($\overline{M}_w$) greater than about 500,000, desirably greater than about 600,000. Below this value there is not sufficient of the polymer material of sufficiently high molecular entanglement and/or relaxation time to enable highly oriented films, in which the polymer material is believed to exist as extended chain fibrils, to be formed by the process of the present invention with commercial viability, if at all. Preferably, $\overline{M}_w$ is greater than about 750,000, desirably greater than about 850,000, especially greater than about 1,00,000.

The process of the invention is carried out by shearing a film of a polymer solution and/or gel.

By 'film of solution and/or gel' is meant herein a thin layer, typically of a thickness not greater than 3 mm.

The process of the present invention is applicable to any thermoplastic organic polymer material, preferably a crystallizable polymer material provided only that the polymer material comprises at least a fraction of sufficiently high molecular weight and that this latter material can form a solution and/or gel. Examples include linear vinyl hydrocarbon polymers, polyethylene oxide, polyacetals such as polyoxymethylene and polyacetaldehyde, aliphatic polyamides, polyesters such as polyethylene terephthalate and fluorinated polymers such as polyvinylidene difluoride.

Preferably, the polymer material comprises a polyolefin, for example polyethylene, polypropylene, polyethylene-polypropylene copolymer or a polyolefin blend comprising at least one thereof, especially linear polyethylene.

It is desirable that the polymer material has a weight average molecular weight ($M_w$) greater than about 500,000, desirably greater than about 600,000. Below this value there is not sufficient polymer material of sufficiently high molecular entanglement and/or relaxation time to enable highly oriented films, in which the polymer material is believed to exist as extended chain fibrils, to be formed by the process of the present invention with commercial viability, if at all. Preferably, $M_w$ is greater than about 750,000, more preferable greater than about 850,000, most preferably greater than about 1,000,000.

The film of solution and/or gel of the polymer material is preferably less than 3 mm thick, more preferably less than 2 mm thick. It is particularly preferred that the film is 1 mm thick or less; for example, no greater than 0.5 mm.

It is highly desirable, and usually necessary, to maintain the solution and/or gel of polymer material at an elevated temperature. For example, it is desirable to maintain the solution and/or gel at a temperature not less than 50° C., preferably not less than 30° C. below the melting temperature of the polymer material. In the case of linear polyethylene, it is desirable that the solution and/or gel is maintained at standard pressure at a temperature greater than 90° C., preferably greater than 100° C., more preferably at a temperature greater than 110° C., most preferably greater than 120° C., such as up to 130° C. The solution and/or gel temperature should not exceed the melting temperature of the polymer material. The tensile properties of the oriented film are found to increase as the solution and/or gel temperature increases. However, the mass of oriented film produced per unit time is found to decrease with increasing solution and/or gel temperature but to increase with increasing shear. To obtain maximum mass per unit time of the oriented film it is therefore necessary to use as low a solution and/or gel temperature as is consistent with the required mechanical properties in conjunction with high shear. The mass growth rates exhibited are much greater than those found in equivalent fibre preparations. It is believed that the presence of a second surface enhances the mass growth rate (at a given temperature) by defining and increasing the effective width over which growth can occur and possibly also by providing enhanced shear between the surfaces.

The solvent used will depend on the nature of the polymer material. In the case of polyolefins, such as linear polyethylene, a hydrocarbon, particularly an aromatic hydrocarbon such as xylene that boils at standard pressure above 140° C. may be used. For polyethylene oxide polar solvents, for example, water or chlorinated hydrocarbons may be used. Solution and/or gels of the polymer material having a concentration for example of from 0.1 wt% to 10 wt%, preferably from 0.2 wt% to 5 wt% are desirable.

Preferably, the surface on which the oriented film of polymer material is formed is at least in part wetted and adhered to by the solution and/or gel of the polymer material. However, the oriented films so formed should, in general, be sufficiently mobile to facilitate ready stripping therefrom during its removal. The surface may be of the same or different polymer material, for example PTFE, or of a metal. The texture of the surface is also an important factor in determining whether the above mentioned functional requirements are met. Thus, where a surface of fabric, such as "leno" woven cotton is used it is usually found that the oriented film is irremovably impregnated thereon. At the other extreme, where the surface is substantially completely not adhered to and smooth, such as a PTFE sheet, no film is usually formed. These properties can be utilized to a beneficial effect in accordance with a preferred embodiment of the invention wherein a portion of, preferably the majority of the, or one of the surfaces on which the oriented film of the polymer material is formed is smooth and not adhered to while a portion, preferably the minority, is adhered to by the solution and/or gel. Specifically, a smooth sheet, for example of PTFE, which is not adhered to can comprise a plurality of lines, for example two lines of stitches such as of cotton thread which extend in the machine direction. It is preferred that at least the or each surface on which the oriented film of the polymer material is formed is in motion.

It has also been found that a relatively coarsely woven fabric such as woven nylon fabric may be used as a surface from which to form a harvestable oriented film of polymer material. The material known as "VELCRO" (manufactured in accordance with U.S. Pat. Nos. 2,717,434 and 3,009,235 and GB Patent Nos. 1,289,825, 1,295,069, 1,299,897, 1,345,607 and 2,009,257; "VELCRO" is a Registered Trade Mark) has been found to be particularly suitable. The continuous oriented film so produced show little or no tendency to lateral shrinkage on drying.

The invention also provides a process wherein a plurality of lines of oriented films of a polymer material may be continuously prepared.

The oriented film of polymer material may be continuously removed in a manner known per se; for example by using the haul-off shown in FIG. 5. It has been found that haul-off load is a good indicator of film thickness, i.e., that growth occurs at constant stress.

According to a further aspect of this invention, an apparatus for the continuous preparation of an oriented film of a polymer material is provided which comprises at least one set of two adjacent surfaces, at least one of which surfaces is endless, movable relative to the other; and means for continuously removing the or each oriented film of polymer material from one of the surfaces on which it is formed. Preferably, such apparatus additionally comprises one or more baths in which the or each set of adjacent surfaces is contained.

Desirably, the endless surface comprises a belt or cylinder. An increase in diameter of the cylinder will increase the defined contact area and possibly also the shear and thus the mass of oriented film produced per unit time. The other surface may comprise a chisel-edged seed-rod of the polymer material or blade of metal. However, it is preferred that the two surfaces are endless.

The machine direction of the oriented film of the polymer material, the direction of one surface, for example the belt and the shear axis of the other surface such as the cylinder in a set are independently variable. When none of these is normal to any other, the oriented film is oriented in a direction different from the machine direction and the degree of orientation changes continuously across the film. When the machine direction of the oriented film of polymer material is normal to one surface but not normal to the shear axis of the other surface, the oriented film is oriented in the machine direction but the degree of orientation changes continuously across the film. When the machine direction of the oriented film of polymer material is normal both to one surface and to the shear axis of the other surface, the oriented film is oriented in the machine direction and the degree of orientation does not substantially change across the film. Preferred apparatus as herein described is that wherein one surface comprises a belt and the other surface comprises a right cylinder rotatable about its axis and bounded, at least in part, by the belt.

There five modes of operation of the apparatus are as follows:
  (a) a moving cylinder and stationary belt;
  (b) a moving cylinder and a belt moving in the opposite hand;
  (c) a moving cylinder and a belt moving in the same hand but slower;
  (d) a moving cylinder and a belt moving in the same hand but faster;
  (e) a stationary cylinder and a moving belt.

In practice, (a) does not appear to produce continuous lengths of oriented film; indeed, it has been found that, using a VELCRO surface, a belt tension of at least 20 N, and preferably greater than 25 N is required to produce an oriented film.

In accordance with a particularly preferred aspect of this invention, there is provided a process as aforesaid wherein a plurality of layers of the oriented film or tape is stacked prior to the application of pressure and heat. While the machine directions of the oriented film or tape in the layers of the stack may be parallel (resulting in a single-laminated self-reinforcing composite), it is preferred that the machine directions of the oriented film or tape in alternate layers of the stack are non-parallel. It is particularly preferred that the machine directions of the oriented film or tape in alternate layers of the stack are at an angle from 75° to 105° (resulting in a cross-laminated self-reinforcing composite).

With particular (but not exclusive) reference to linear polyethylene it is found, by scanning electron microscopy (SEM) and differential scanning calorimetry (DSC), that the oriented films or tapes prepared in accordance with UK Patent Specification No. 2,164,603 comprise oriented fibrils embedded in a matrix of unoriented material, the proportion of the latter increasing with throughput rates. It is found (by DSC) that the oriented films or tapes melt in two easily distinguished stages: thus, melting begins at about 118° C. while the oriented fibrils melt at much higher temperature range from 147° to 151° C. We have perceived that by heating such oriented films or tapes at a temperature from 110° to 140° C., preferably from 125° to 135° C., we can, by partially melting the unoriented material under pressure (for example, 2500 psi) but with retention of the oriented fibrils, either improve the mechanical properties of a single layer of the oriented film or tape or prepare a self-reinforcing composite from a plurality of such layers.

For other polymer materials, it is to be expected that the temperature range will differ.

By "self-reinforcing composite" is meant herein a material which, aside from any added fillers, is chemically homogeneous in the bulk but which comprises a dispersed phase of different morphology (but of the same chemical composition; in this case, the oriented fibrils) which is disposed to reinforce the continuous phase.

This invention also provides a self-reinforcing composite prepared as herein described. In particular, this invention provides a self-reinforcing composite of linear polyethylene having a sole melting point peak (DSC) at about 147° to 151° C.

Such materials are found to have a Young's modulus from 15 to 50 GPa, for example from 20 to 40 GPa; and a tensile strength from 0.75 to 1.50 GPa.

The invention will be further described, by way of example, with reference to the accompanying drawings in which:

FIG. 1 represents an apparatus in which one surface is provided by a chisel-shaped seed-rod and the other by a rotatable cylinder;

FIG. 2 represents an apparatus in which one surface is provided by a scraper blade and the other by a rotatable cylinder;

Figure 4:
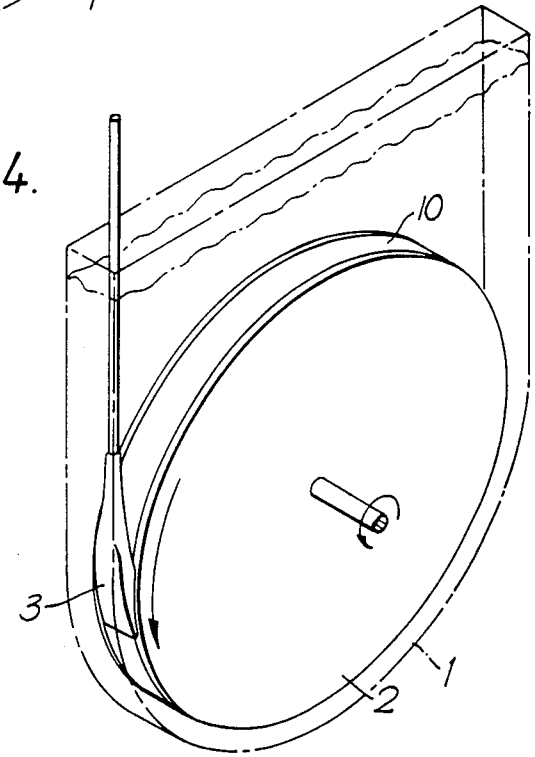
FIG. 4 represents an apparatus in which one surface is provided by a chisel-shaped seed-rod and the other by a rotatable cylinder of large diameter (27 cm diameter compared with 8 cm diameter)

In the drawings, the apparatus represented in FIGS. 1 and 4 comprises a bath 1 in which a cylinder 2 having a cylindrical surface of PTFE rotatable about a horizontal axis is contained. A chisel-shaped seed-rod 3 of polyethylene is maintained in sliding contact with the cylinder.

In FIG. 2 the seed-rod is replaced by a scraper blade 4 of sprung steel.

Figure 3:
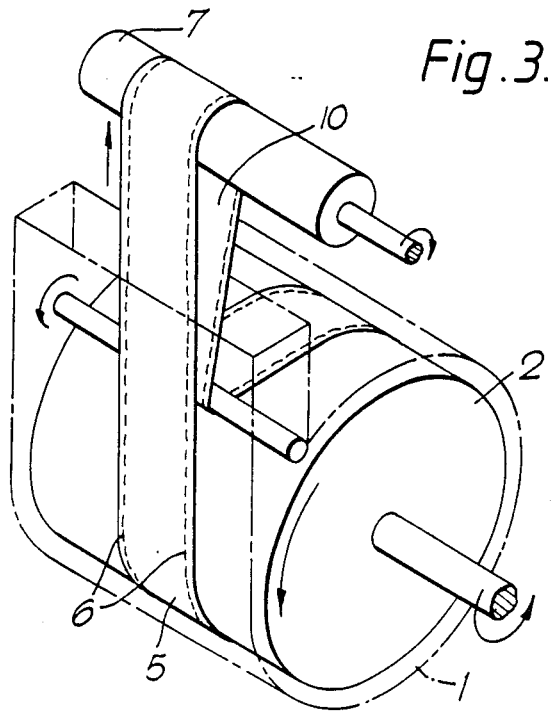
FIG. 3 represents an apparatus in which one surface is provided by a belt and the other by a rotatable cylinder.
Figure 5:
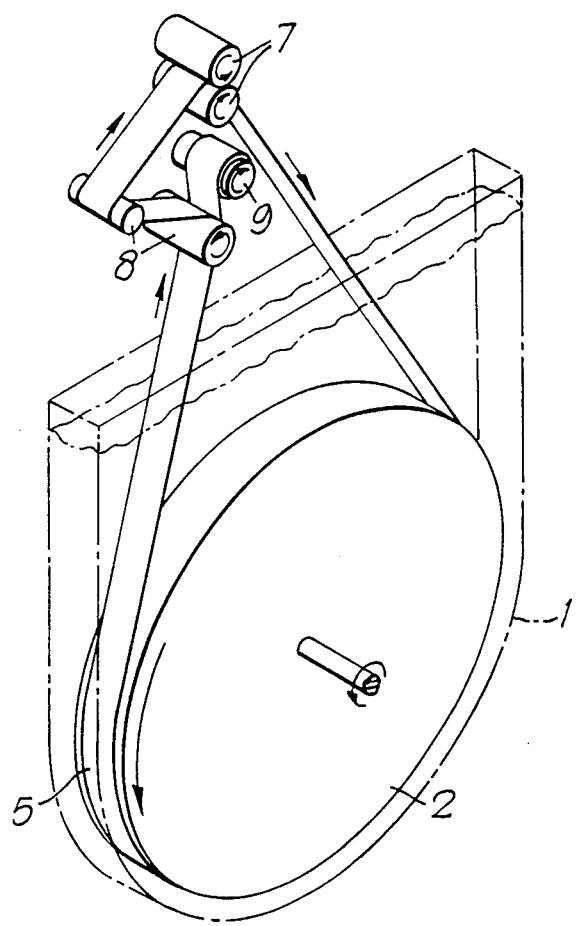
FIG. 5 represents an apparatus in which one surface is provided by a belt and the other by a rotatable cylinder of large diameter.

In FIGS. 3 and 5 the seed-rod is replaced by a continuous belt 5 of PTFE which comprises two lines 6 of stitched cotton thread which is in sliding contact with the cylinder and which is friction drivable by passage over drivable roller(s) 7. In FIG. 3 there is also represented belt-tensioning spools 8 over which the belt is laced and a film wind-off spool 9.

In use, the bath 1 is substantially filled with a dilute (less than 10 wt%) solution and/or gel of high molecular polyethylene in xylene which is equilibrated at about 110° C. by heating means (not shown). The cylinder is then caused to rotate by drive means (not shown). Thereafter the seed-rod, scraper blade or belt is maintained in sliding contact (the belt optionally being driven) with the cylinder. As film 10 is formed it is laced to a wind-off spool.

EXAMPLE

Four strips of polyethylene oriented tape produced in accordance with the process of UK Patent Specfication No. 2,164,603 were stacked with their machine directions parallel. The stack was then carefully placed between two highly polished, flat, stainless steel discs and inserted in a hydraulic press, fitted with heating plates which were heated to a temperature in the range from 130° to 136° C. A pressure of 2,500 psi was then applied to the heated press for a period of 6 minutes whereupon the sample was water-cooled and removed from the press to produce a single laminated self-reinforcing composite.

A cross-laminated self-reinforcing composite was prepared, in essentially the same manner, by stacking three strips of the oriented tape, the central strip of the stack having its machine direction at right angles to the other two.

DSC experiments on the composite showed that the low melting point peak had disappeared but that the high melting point peak had remained at 150° C. (A totally melted and cooled specimen exhibited only the customary peak at 133° C. on reheating). This indicated that the original structure of the oriented fibrils had been retained. Preliminary results indicated a Young's modulus of 20 GPa and a strength to break of 0.86 GPa.

We claim:

1. A process for producing a polymer material comprising
    (i) shearing at least one film of a solution or gel of the polymer material between at least one set of two surfaces which are in motion relative to one another, at least one of said surfaces being endless so as to cause, by said shearing, solidification of said polymer material from said solution or gel to a degree sufficient that a coherent, oriented film or tape of said polymer material is formed on one of said surfaces, which film or tape is sufficiently coherent to be capable of being removed from the surface on which it is formed;

(ii) continuously removing the or each oriented film or tape of polymer material from the surface on which it is formed; and (iii) subjecting at least one layer of such an oriented film or tape to a pressure greater than ambient pressure while heating said oriented film or tape to a temperature at which partial melting thereof occurs but which does not exceed 145° C.

2. A process according to claim 1 wherein the polymer material comprises a polyolefin.

3. A process according to claim 2 wherein the polyolefin is selected from the group consisting of polyethylene, polypropylene, a polyethylene-polypropylene copolymer of a polyolefin blend comprising at least one thereof.

4. A process according to claim 3 wherein the polyethylene comprises linear polyethylene.

5. A process according to any preceding claim wherein the polymer material has a weight average molecular weight greater than 500,000.

6. A process according to claim 5 wherein the polymer material has a weight average molecular weight greater than 750,000.

7. A process according to claim 4 wherein the polyethylene comprises linear polyethylene having a weight average molecular weight greater than 1,000,000.

8. A process according to claim 1 wherein a plurality of layers of the oriented film or tape is stacked prior to the application of pressure and heat.

9. A process according to claim 8 wherein the machine directions of the oriented film or tape in alternate layers of the stack are non-parallel.

10. A process according to claim 9 wherein the machine directions of the oriented film or tape in alternate layers of the stack are at an angle from 75° to 105°.

11. A process according to claim 1 wherein the oriented film or tape is heated to a temperature from 110° to 140° C.

12. A process according to claim 11 wherein the temperature is from 125° C. to 135° C.

13. A process for the continuous preparation of an oriented film or tape of a polymer material comprising:

(i) shearing at least one film of a solution or gel of the polymer material between at least one set of two surfaces which are in motion relative to one another, at least one of which surfaces is endless so as to cause, by said shearing, solidification of said polymer material from said solution or gel to a degree sufficient that a coherent, oriented film or tape of said polymer material is formed on one of said surfaces, which film or tape is sufficiently coherent to be capable of being removed from the surface on which it is formed;

(ii) continuously removing the or each oriented film or tape of polymer material from the surface on which it is formed; and (iii) subjecting at least one layer of the oriented film or tape to a pressure greater than ambient pressure while heating the oriented film or tape to a temperature at which partial melting thereof occurs but which does not exceed 145° C.

14. A post forming process for an oriented film or tape of polymer material, which process comprises:

(a) obtaining an oriented film or tape of polymer material, which oriented film or tape of polymer material is preparable by the steps of:

(i) shearing at least one film of a solution or gel of the polymer material between at least one set of two surfaces which are in motion relative to one another, at least one of which surfaces being endless so as to cause, by said shearing, solidification of said polymer material from said solution or gel to a degree sufficient that a coherent, oriented film or tape of said polymer material is formed on one of said surfaces, which film or tape is sufficiently coherent to be capable of being removed from the surface on which it is formed; and (ii) continuously removing the or each oriented film or tape of polymer material from the surface on which it is formed, and comprises oriented fibrils embedded in a matrix of unoriented material, the fibrils and matrix being compositionally uniform; and (b) subjecting at least one layer of such an oriented film or tape to a pressure greater than ambient pressure while heating said oriented film or tape to a temperature at which partial melting thereof occurs but which does not exceed 145° C.

* * * * *